March 29, 1960  L. L. ASPELIN  2,930,661
THRUST BEARING
Filed Feb. 15, 1957
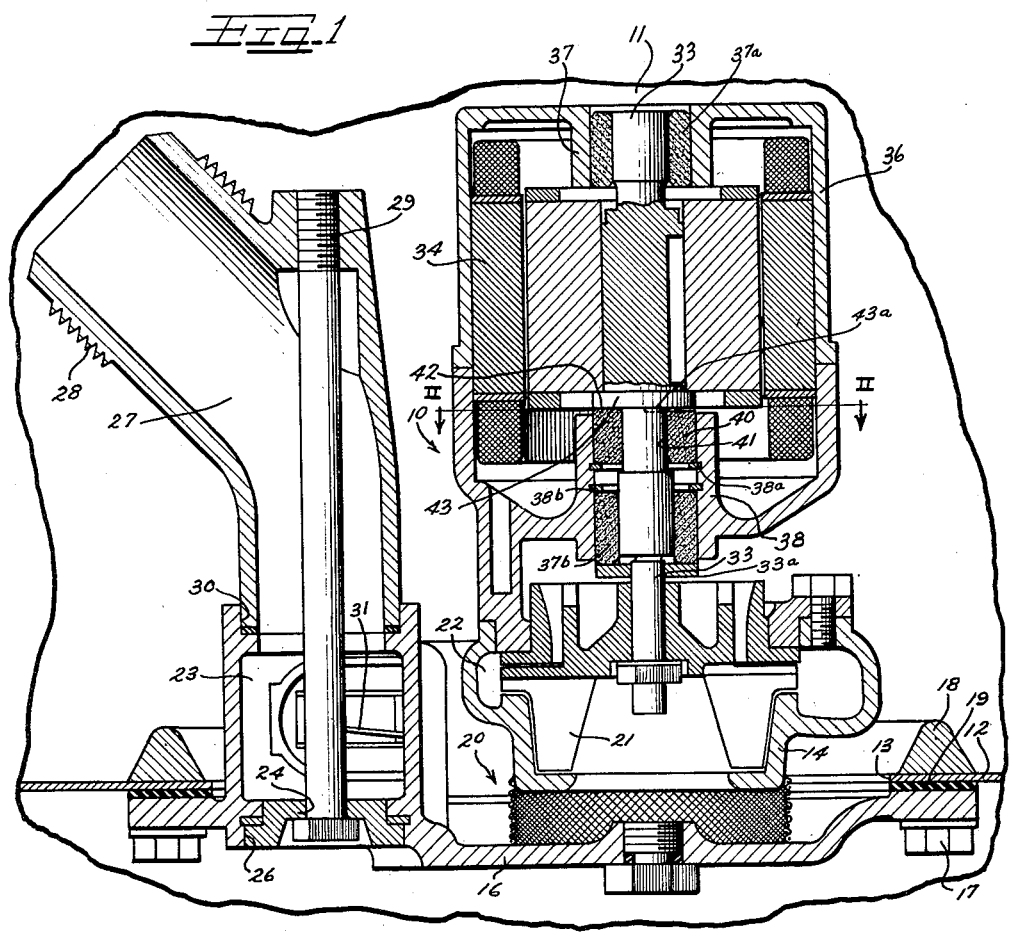
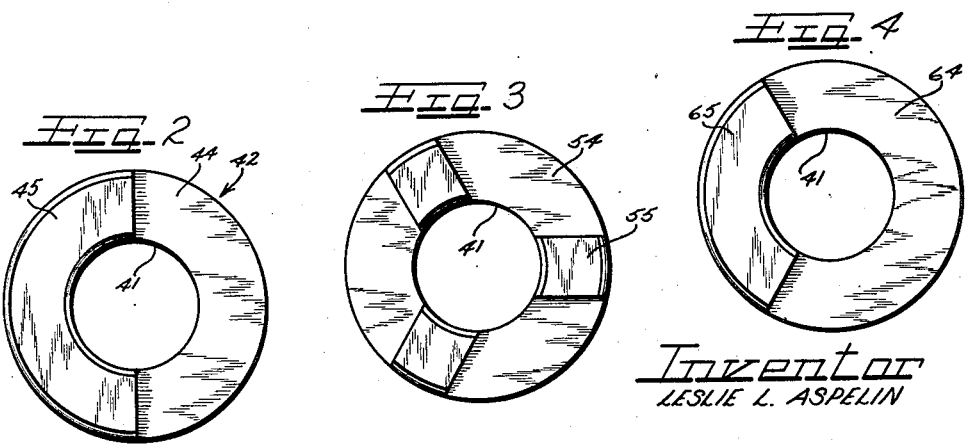
Inventor
LESLIE L. ASPELIN United States Patent Office 2,930,661
Patented Mar. 29, 1960

2,930,661

THRUST BEARING

Leslie L. Aspelin, Cleveland Heights, Ohio, assignor to Thompson Ramo Wooldridge Inc., a corporation of Ohio Application February 15, 1957, Serial No. 640,366

11 Claims. (Cl. 308—160)

This invention relates generally to aircraft fuel systems and more specifically to an improved booster pump incorporating a thrust bearing construction capable of running dry.

Although the principles of the present invention are of general utility, a particularly useful application is made in connection with a fuel booster pump such as is included in the fuel system of aircraft. Altitude and speed ranges of contemporary aircraft are ever on the increase and there is a distinct need for a fuel booster pump capable of running dry at high altitude for prolonged periods of time. This need is particularly acute as the control requirements placed on operating personnel are increased. By virtue of the present invention the pilot may be relieved of any operational risk associated with switching the booster pump on or off.

Although alternating current booster pumps utilizing sleeve-type carbon bearings and hardened steel shafts provide a good dry running combination of materials, there is oftentimes produced in such a pump loud screeching noises. It appears that such screech is symptomatic of a vibratory dynamic action wherein the shaft bounces from one side to another in the clearances of its sleeve bearing and friction is increased to the point where the motor is slowed down and possibly overloaded sufficiently to burn out the windings.

The dry-run chatter and screech in a booster pump is attributable in some measure to the flat thrust bearings of the pump.

The present invention contemplates the utilization of a bearing construction which will insure the successful operation of a booster pump at any altitude without chatter or screech even though the pump is required to run dry for an extended period of time.

It is an object of the present invention, therefore, to provide a booster pump which is capable of successful chatterless, screechless operation at higher altitudes than have heretofore been possible.

Another object of the present invention is to provide an improved booster pump and bearing wherein high altitude dry-running can be successfully accomplished.

Yet another object of the present invention is to provide a bearing construction which will journal a rotatable part for dry-running.

Another object of the present invention is to provide a bearing assembly which will run dry without damage or excessive wear and without chattering and screeching.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

On the drawings:

Figure 1 is a fragmentary cross-sectional view of a submerged aircraft fuel booster pump equipped with a thrust bearing provided in accordance with the principles of the present invention;

Figure 2 is a cross-sectional view taken generally on line II—II of Figure 1; and Figures 3 and 4 each represent alternative embodiments of the present invention which are otherwise analagous to the form of the invention shown in Figure 2.

As shown on the drawings:

The principles of this invention are particularly useful when embodied in a booster pump of an aircraft fuel supply system. Such a pump is illustrated in Figure 1.

Referring to Figure 1, a high altitude booster pump is generally indicated by the numeral 10, and is arranged for submerged mounting in a fuel cell 11. The fuel cell 11 has a bottom wall 12 provided with an opening 13, through which extends a pump casing 14. A cover portion 16 has flanges overlying the edges of the opening 13 and suitable fastening means 17 engage a retainer ring 18 positioned on the inside of the fuel cell 11. A sealing gasket 19 seals the joint between the bottom wall 12 and the booster pump 10.

The booster pump 10 has a bottom inlet indicated generally at 20 through which fuel is supplied to a center inlet impeller 21, the fuel advancing axially and being discharged centrifugally into a volute 22 for delivery to an outlet 23. The outlet 23 is adapted for outside or inside discharge and in the form of the invention illustrated, a plug 24 closes the outside discharge opening 26, an inside conduit 27, being provided and having suitable thread means 28 formed thereon for connection to conduit means (not shown). The conduit 27 is retained by a bolt 29 and carries pressurized fluid delivered from an inside discharge port 30. A check valve generally indicated at 31 controls an aperture leading from the fuel cell 11 back into the pump outlet 23 permitting fuel to flow from the fuel cell 11 through the check valve 31, into the pump outlet 23, and the conduit 27, allowing the fuel to by-pass the pumping parts of the booster pump assembly 10 with a minimum loss in pressure in case of pump failure. The impeller 21 is rotated or driven by a power take-off shaft 33 to which the impeller 21 is connected, the power take-off shaft 33 being driven by an electric motor 34 enclosed within a motor casing 36 mounted in integral assembly with the pump casing 14.

The casing components of the apparatus provide a pair of bearing bosses 37 and 38 which are longitudinally spaced from one another and which are each adapted to receive a carbon sleeve bearing 37a and 40, respectively, thereby to rotatably journal and support the shaft 33 at longitudinally spaced points.

There is additionally provided a sleeve bearing 37b in the boss 38 providing radial journal support for the shaft 33 adjacent the impeller 21. A pair of retainer snap rings 38a and 38b are received in grooved portions of the boss 38 to engage against the adjoining end surfaces of the sleeve bearings 40 and 37b and prevent relative axial displacement of the sleeve bearings in the boss.

A thrust collar 33a carried by the shaft 33 engages a projecting thrust face on the sleeve bearing 37b and a thrust collar 43 carried on the shaft 33 has a radial thrust face 43a engaging the adjoining bearing face of the sleeve bearing 40.

The sleeve bearing 40 has an inner cylindrical bearing surface 41 surrounding a portion of shaft 33 and serving as a journal surface for a portion of the shaft 33. Thus, it can be seen that the shaft 33 and the sleeve 41 comprise inner and outer relatively rotatable parts, the one being bearingly supportable by the other.

The sleeve 40 has a radially disposed bearing face 42 at one end thereof which is generally flat, annular and disposed perpendicular or normal to the axis of rotation of the rotatable element or shaft 33.

Means forming a second bearing face 43a, rotatable with the shaft are positioned adjacent to and confronting the face 42 to transmit axial thrust forces against the bearing face 42. The face 43a may be provided by a collar 43 formed as an integral portion of shaft 33, the collar 43 may be a component secured to shaft 33, or it may be any other convenient portion of the rotor which bearingly engages face 42.

In accordance with the principles of the present invention the face 42 is particularly characterized by being partially cut away or recessed as at 44 to define two semi-circular portions, 44 and 45. The semi-circular portion 45 thus carries or receives the axial load from face 43a and may be said to be an arc-like load carrying portion.

When pumps incorporating ordinary sleeve bearings are operated, satisfactory performance is obtained so long as the pump is immersed in fuel. However, when the fuel has drained from the cell and hence from the motor and bearings, a conventional pump has a tendency to chatter and screech. The provision of the undercut or recess 44 in accordance with the invention completely eliminates the chattering of a dry-running pump.

Apparently when the mutual faces 42 and 43a are circumferentially continuous and both fully engage each other, there is an instability present which, coupled with frictional drag, causes the shaft to move about radially within its small clearance in the bearings and the life of the apparatus is shortened. When one of the mutual faces of the sleeve bearing or the shaft in flatwise engagement and perpendicular to the axis of rotation is recessed at a point opposite to a point carrying the load on the same face in accordance with the present invention, the instability is removed and the chatter is eliminated, thereby insuring a longer service life for the equipment.

It is apparent that the chatter may be eliminated by providing the recess in either of the mutual faces. However, for ease of manufacture, it may be preferable to provide the recess in the bearing face 42 of the sleeve 40. Thus, if a relatively small area is left on one side of the bearing face to carry the thrust load, the chatter is eliminated. Of course, the segment which is cut away may be positionably selected from the annular portion of face 42 so as to produce a very slight canting of the shaft 33 in a direction which is most favorable in light of the design of other bearings or components used in conjunction with the shaft.

The thrust bearing or sleeve 40 may be made of carbon while the face 43a may comprise steel.

Referring to Figure 3, there is shown an alternative embodiment wherein the face of the sleeve 40 is recessed to provide three thrust lands 55, shown equally spaced, to take the rubbing load of the rotating thrust face or washer 43. It can be seen that this arrangement has the additional advantage that the thrust face area is symmetrically distributed around the periphery of the thrust bearing.

Referring to Figure 4, there is shown another form of the invention wherein there is a single continuous thrust land 65, the ends of which are at opposite ends of a recess 64 which extends through more than 180° of arc. This arrangement of the portions of the annular face 42 prevents any possibility of bouncing or chattering occurring on opposite sides of the vertical center line as shown in Figure 2.

In its broadest concept, this modification may take the form of a pin comprising bearing material, eccentrically mounted with respect to face 43 and bearing thereagainst. Likewise face 43 may comprise bearing material in engagement with a pin, such pin being analagous to the land 65.

Thus, it can be seen from Figures 2-4 that the face 42 of sleeve 40 comprises adjacent arcuate portions which alternately comprise recesses or cutaway portions and load carrying portions. It may also be seen that at any point on load carrying portions 45, 55 and 65, there is a recessed portion diametrically opposite thereto. Thus, there is an even number of alternating load and non-load portions, one-half of which constitute an odd number. Further, the total circumferential extent of the load carrying portions does not exceed 180° of arc, while the non-load recessed portions may exceed 180°. Thus the fraction of the annular face which is recessed may equal or exceed the load carrying portion.

The terms "arcuate," "arc," and "arc-like" are intended to refer herein to radial angles less than 359°.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In a thrust bearing including a sleeve extending around a rotatable element, said sleeve having a generally flat annular thrust bearing face perpendicular to the axis of said rotatable element for rotatably continually directly opposing axial forces transmitted by said rotatable element against said sleeve, the improvement comprising: alternate angularly spaced non-load-carrying cutaway and load-carrying rigid arc portions in said face, said portions having such a location that at all positions 180° opposite to every load-carrying portion, there is only a cutaway portion.

2. In a thrust bearing including a sleeve extending around a rotatable element, said sleeve having a generally flat annular thrust bearing face perpendicular to the axis of said rotatable element for rotatably continually directly opposing axial forces transmitted by said rotatable element against said sleeve, the improvement comprising: an odd number, including one, of arcuate rigid load-carrying portions in said face, each end of said arcuate load-carrying portion or portions being radially defined by an arcuate recess, every part of said number of load-carrying portions lying 180° opposite only to a recess.

3. In a thrust bearing including a sleeve extending around a rotatable element, said sleeve having a generally flat annular thrust bearing face perpendicular to the axis of said rotatable element for rotatably continually directly opposing axial forces transmitted by said rotatable element against said sleeve, the improvement comprising: at least one arcuate rigid load-carrying portion in said face and at least one arcuate non-load-carrying portion in said face, said at least one load-carrying portion extending for a total arc not over 180° and lying diametrically opposite to only said at least one non-load-carrying portion.

4. In a thrust bearing including a sleeve extending around a rotatable element, said sleeve having a generally flat annular thrust bearing face perpendicular to the axis of said rotatable element for rotatably continually directly opposing axial forces transmitted by said rotatable element against said sleeve, the improvement comprising: two arcuate rigid portions in said face; one of said portions being load-carrying, and extending up to 180° of arc; the other of said portions being recessed over its entire radial extent and hence non-load-carrying, defining the ends of said one portion, and including every point lying diametrically opposite to every part of said load-carrying portion.

5. In a thrust bearing including a sleeve extending around a rotatable element, said sleeve having a generally flat annular thrust bearing face perpendicular to the axis of said rotatable element for rotatably continually directly opposing axial forces transmitted by said rotatable element against said sleeve, the improvement comprising: two arcuate rigid portions in said face; one of said portions being load-carrying, and extending for 180° of arc; the other of said portions being recessed over its entire radial extent and hence non-load-carrying, extending to the ends of said one portion, and including every point lying diametrically opposite to every part of said load-carrying portion.

6. In a thrust bearing including a sleeve extending around a rotatable element, said sleeve having a generally flat annular thrust bearing face perpendicular to the axis of said rotatable element for rotatably continually directly opposing axial forces transmitted by said rotatable element against said sleeve, the improvement comprising: two arcuate rigid portions in said face; one of said portions being load-carrying and extending less than 180° of arc; the other of said portions being recessed over its entire radial extent and hence non-load-carrying, extending to the ends of said one portion, and including every point lying diametrically opposite to every part of said load-carrying portion.

7. In a thrust bearing including a sleeve extending around a rotatable element, said sleeve having a generally flat annular thrust bearing face perpendicular to the axis of said rotatable element for rotatably continually directly opposing axial forces transmitted by said rotatable element against said sleeve, the improvement comprising: an even number of arcuate rigid portions in said face; one-half of said portions being load-carrying and each extending less than 180° of arc; the other half of said portions each being recessed over the entire radial extent and hence non-load-carrying; said other half of said portions extending for a combined angle exceeding 180° and including every point lying diametrically opposite to said one-half of said portions.

8. In a thrust bearing including a sleeve extending around a rotatable element, said sleeve having a generally flat annular thrust bearing face perpendicular to the axis of said rotatable element for rotatably continually directly opposing axial forces transmitted by said rotatable element against said sleeve, the improvement comprising: an even number of arcuate rigid portions in said face; an odd number of said portions being load-carrying and each extending up to 180° of arc; a like odd number of said portions being recessed over the entire radial extent and hence non-load-carrying, each extending up to 180° of arc, and including every point lying diametrically opposite to one of said odd number of load-carrying portions.

9. In a rotating machine, in combination, a sleeve, said sleeve having an inner cylindrical bearing surface; a relatively rotatable element supported by said surface; said sleeve and said element each having a mutually continually directly engaging face at right angles to the axis of rotation; at least one rigid axial-load-carrying portion in one of said faces; said one of said faces being recessed over its entire radial extent diametrically opposite to said portion.

10. In a rotating machine, in combination, a rigid bearing having a face; a rigid relatively rotatable element also having a face; said faces being in continual direct flatwise engagement with each other and perpendicular to the axis of rotation; at least one rigid load-carrying portion in one of said faces; the other of said faces being free of said one face at every radial point located diametrically opposite to said load-carrying portion.

11. In a thrust bearing including a sleeve extending around a rotatable element, said sleeve having a generally flat annular thrust bearing face perpendicular to the axis of said rotatable element for rotatably continually directly opposing axial forces transmitted by said rotatable element against said sleeve, the improvement comprising: at least three arcuate rigid load-carrying portions in said face, said portions each having less than 60° of arc and being spaced from each other; and arcuate recessed portions intermediate and including every point lying diametrically opposite said load-carrying portions.

References Cited in the file of this patent

UNITED STATES PATENTS

| | | |
|---|---|---|
| 1,735,315 | Fulpius | Nov. 12, 1929 |
| 1,906,715 | Penick | May 2, 1933 |
| 2,054,912 | Riebe | Sept. 22, 1936 |
| 2,318,114 | Tichvinsky | May 4, 1943 |
| 2,362,667 | Schmidt | Nov. 14, 1944 |
| 2,380,179 | Huber | July 10, 1945 |
| 2,413,546 | Curtis et al. | Dec. 31, 1946 |
| 2,645,534 | Becker | July 14, 1953 |

OTHER REFERENCES

Air Bearings by D. D. Fuller, published in Lubrication Engineering, December 1953, pages 298 to 301 relied upon.